United States Patent [19]
Sei et al.

[11] 4,309,635
[45] Jan. 5, 1982

[54] SQUIRREL-CAGE ROTOR HAVING END RINGS OF DOUBLE STRUCTURE

[75] Inventors: Makio Sei, Nakaminato; Kunio Miyashita, Hitachi, both of Japan

[73] Assignee: Hitachi, Ltd., Tokyo, Japan

[21] Appl. No.: 117,623

[22] Filed: Feb. 1, 1980

[30] Foreign Application Priority Data

Feb. 7, 1979 [JP] Japan .................. 54-12303

[51] Int. Cl.$^3$ .............................................. H02K 3/06
[52] U.S. Cl. .................................... 310/211; 310/42; 310/125
[58] Field of Search ............... 310/212, 211, 124, 125, 310/182, 183, 156, 42, 261, 264, 265, DIG. 2, DIG. 4, 197

[56] References Cited
U.S. PATENT DOCUMENTS

| | | | |
|---|---|---|---|
| 680,792 | 8/1901 | Lamme | 310/211 |
| 1,031,802 | 7/1912 | McCollum | 310/212 |
| 1,156,364 | 10/1915 | McCollum | 310/212 |
| 1,371,233 | 3/1921 | Fries | 310/211 |
| 1,678,912 | 7/1928 | McLeod | 310/212 |
| 1,694,061 | 12/1928 | Hansen | 310/212 |
| 2,748,333 | 5/1956 | Lee | 310/212 |

FOREIGN PATENT DOCUMENTS 248137 10/1910 Fed. Rep. of Germany ...... 310/212

*Primary Examiner*—R. Skudy
*Attorney, Agent, or Firm*—Craig and Antonelli

[57] ABSTRACT

A squirrel-cage rotor for an induction motor is disclosed. In this rotor, each of end rings electrically connecting the associated ends of the conductor bars received in the slots of the rotor core comprises a first ring portion disposed in contact with the associated end face of the rotor core, and a second ring portion disposed on or coupled to the first ring portion through a member of a magnetic material in the axial direction of the motor, this second ring portion having a sectional area smaller than that of the first ring portion when the section is taken in a direction orthogonal with respect to the axis of the motor.

6 Claims, 13 Drawing Figures

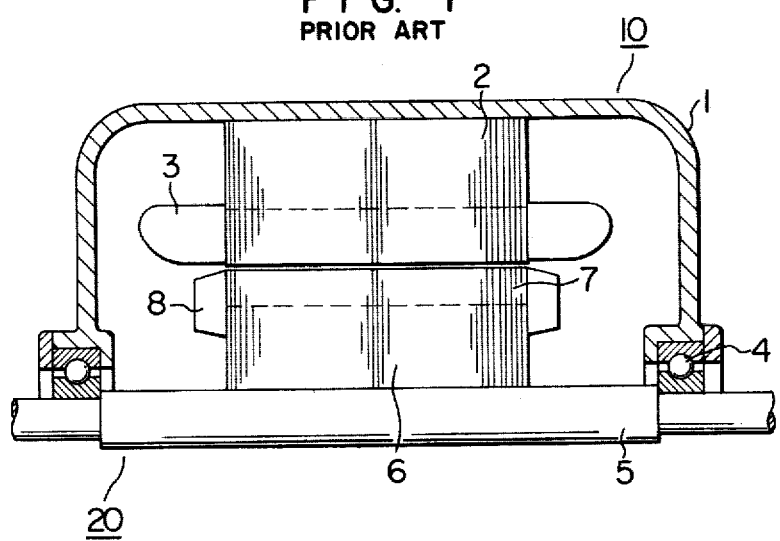
FIG. 1
PRIOR ART
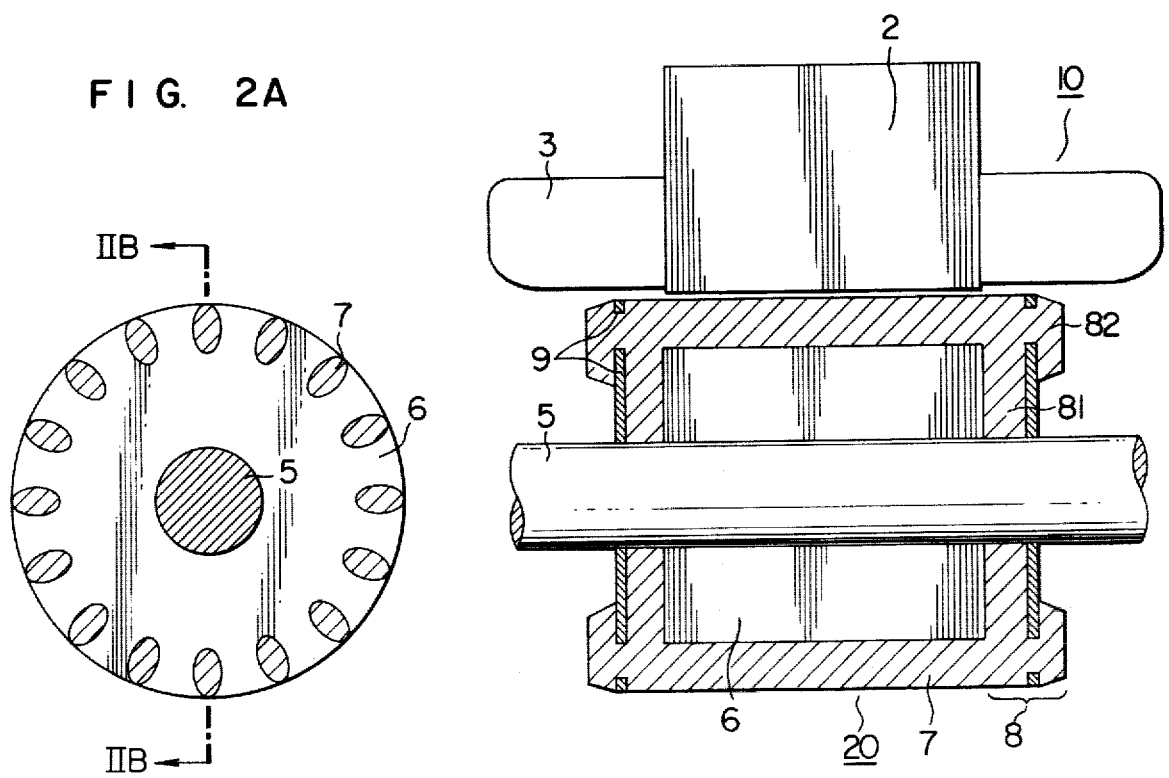
FIG. 2A
FIG. 2B

SQUIRREL-CAGE ROTOR HAVING END RINGS OF DOUBLE STRUCTURE

This invention relates to the structure of a squirrel-cage rotor in an induction motor, and more particularly to a squirrel-cage rotor having end rings of double structure for improving the starting characteristic of such an induction motor.

The prior art and the invention and advantages of the latter will be described with reference to the accompanying drawings, in which:

FIG. 1 is a schematic axial sectional view of a prior art induction motor and shows the upper half thereof only;

FIGS. 2A and 2B are schematic sectional views to show an embodiment of the squirrel-cage rotor according to the present invention;

Figure 3:
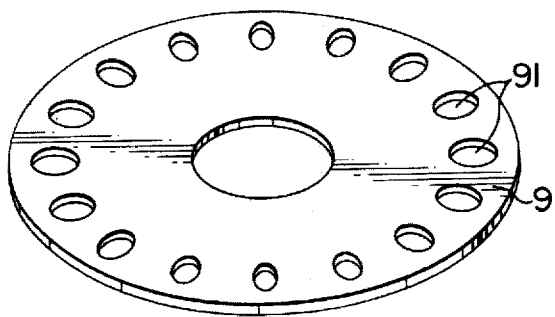
FIG. 3 is a schematic perspective view of part of the magnetic member incorporated in the embodiment shown in FIGS. 2A and 2B.

Induction motors are commonly widely used as drive power sources for various machines and tools because of the merits that they are simple in construction, strong and durable, easily inspected for maintenance during operation, and reliable. Rotors of induction motors of small capacity are mostly designed to include squirrel-cage windings, and such rotors are manufactured by the die casting of a metal material such as aluminum from the viewpoint of high productivity.

FIG. 1 is a schematic axial sectional view of a prior art squirrel-cage induction motor of small capacity and shows the upper half thereof only. Referring to FIG. 1, a stator 10 includes a housing 1, a stator core 2 fixedly mounted in this housing 1, and a stator winding 3 wound around this stator core 2. A rotor 20 includes a shaft 5 journalled in bearings 4, a substantially cylindrical rotor core 6 of laminated structure fixedly mounted on the shaft 5, a plurality of conductor bars 7 received in a plurality of slots formed along the outer peripheral surface of the rotor core 6 to extend substantially in parallel with the shaft 5, and a pair of end rings 8 electrically connecting the associated ends of the conductor bars 7. The stator winding 3 is so connected and disposed as to induce a rotatary magnetic field in the air gap between the stator and the rotor.

In such an induction motor, however, a small torque is only available for starting. This is because the secondary power factor is low due to the high secondary frequency in the starting stage, and therefore, the starting torque is small in spite of the fact that a large starting current is supplied for the starting purpose. An increase in the secondary resistance in an effort to increase this starting torque results in an undesirable lowering of the efficiency during steady operation although the starting torque can be increased.

A double squirrel-cage rotor and a deep-slot squirrel-cage rotor are known as squirrel-cage rotors capable of improving the starting torque. However, due to the fact that the depth of the slots formed in the rotor core of each of these rotors is increased, and the distance between the bottom of the slots and the surface of the shaft, or the so-called back height, becomes considerably small, the magnetic flux density becomes high in the magnetic path of the rotor core, and magnetic saturation of the rotor core will be caused and the exciting current will be increased, which causes problems such as lowering the motor efficiency and overheating the windings. Therefore, it becomes necessary to increase the axial length of the rotor core to lower the magnetic flux density, which however, results in a large sized motor.

Further, in the double squirrel-cage rotor or the deep-slot squirrel-cage rotor, the length of the tooth portions between the adjacent slots increases in the radial direction, and hence a greater loss occurs in the magnetomotive force, i.e., ampere-turns due to the increased magnetic reluctance of the tooth portion. For preventing such a greater loss, the width of the tooth portions must be increased, which results in increasing the radius of the rotor core.

An induction motor of a small capacity such as 100 W−1 KW frequently employs such a double squirrel-cage rotor or deep-slot squirrel-cage rotor for improving the starting torque, but such a motor inevitably involves an undesirable increase in size.

It is a primary object of the present invention to obviate prior art defects as pointed out above and to provide an improved squirrel-cage rotor for an induction motor so that it can operate with an improved starting characteristic.

The improved squirrel-cage rotor according to the present invention is featured by the fact that each of the end rings electrically connecting the associated ends of the conductor bars received in the slots of the rotor core includes a first ring portion disposed to be in contact with the associated end face of the rotor core, and a second ring portion disposed on or coupled to the first ring portion through a magnetic member in the axial direction of the induction motor, the second ring portion being electrically connected to the first ring portion and having a sectional area orthogonal to a circumference around the axis of the motor, smaller than that of the first ring portion.

Preferred embodiments of the present invention will now be described in detail with reference to FIGS. 2 to 10 in which the same reference numerals are used to designate the same parts appearing in FIG. 1.

FIG. 2A is a schematic sectional view of an embodiment of the squirrel-cage rotor according to the present invention when the section is taken in a direction orthogonal with respect to the axis of the motor, and FIG. 2B is a schematic axial sectional view taken along the line IIB—IIB in FIG. 2A.

Referring to FIGS. 2A and 2B, each end ring 8 includes a first ring portion 81 disposed in contact with the associated end face of the rotor core 6 and a second ring portion 82 disposed in juxtaposed relation with the first ring portion 81 in the axial direction of the rotor core 6. That is, each of the end rings 8 is composed of the first and second ring portions 81 and 82 associated with the corresponding end faces of the rotor core 6, and these ring portions 81 and 82 are disposed in such relative positions that the second ring portion 82 is outer relative to the first ring portion 82 in the axial direction of the rotor core 6. These ring portions 81 and 82 extend in a direction of a circumference whose center lies on the axis of the motor, and the secondary current induced in the conductor bars 7 flows in the circumferential direction of these ring portions 81 and 82. As seen in FIG. 2B, the sectional area of the second ring portion 82 orthogonal to a circumference around the motor axis is smaller than that of the first ring portion 81 as shown in FIG. 2B. Also, as seen from FIG. 2B, the first ring portion 81 has a relatively-larger width in the radial direction than the second ring portion 82, and the first and second ring portions 81 and 82 and the conductor bars 7 are formed integrally with each other by the die casting of a metal material such as aluminum as described above.

A member 9 of a magnetic material in plate form as partly shown in FIG. 3 is disposed between the first ring portion 81 and the second ring portion 82 of each end ring 8. The shape of this magnetic member 9 is substantially the same as the sectional shape of the rotor core 6, and this magnetic member 9 is provided with a plurality of suitably spaced holes 91 adjacent to its outer periphery as seen in FIG. 3. This magnetic member 9 may naturally be made of silicon steel which constitutes the laminated rotor core 6, and the number and shape of the holes 91 formed in the magnetic member 9 may be suitably selected by the designer. The first ring portion 81 and the second ring portion 82 separated by the magnetic member 9 are electrically connected with each other through the holes 92 of the magnetic member 9.

The first ring portion 81, the second ring portion 82 and the conductor bars 7 are formed or cast into an integral structure by a process which will be described presently. According to this process, the shaft 5, the slotted rotor core 6 fixedly mounted on the shaft 5 and the magnetic members 9 are disposed at predetermined positions within a mold having a predetermined internal configuration, and then, a molten conductive metal, for example, molten aluminum is poured into the mold. By the above steps, the first and second ring portions 81 and 82 of the end rings 8 are formed, and, at the same time, the conductive metal fills the slots of the rotor core 6 to form the conductor bars 7. The conductive metal fills also the holes 91 of the magnetic members 9 to electrically connect the first and second ring portions 81 and 82 in the integral casting.

In the squirrel-cage rotor structure thus obtained, the first ring portion 81 in each end ring 8 is engaged at its opposite sides by the magnetic member 9 and the associated end face of the rotor core 6 which is also made of the magnetic material. Therefore, the reactance $x_{21}$ of the first ring portion 81 is larger than the reactance $x_{22}$ of the second ring portion 82. Further, due to the fact that the sectional area of the first ring portion 81 is larger than that of the second ring portion 82, the resistance $r_{21}$ of the first ring portion 81 is smaller than the resistance $r_{22}$ of the second ring portion 82. Thus, there hold the relations $x_{21} > x_{22}$ and $r_{21} < r_{22}$.

On the other hand, a magnetomotive force is produced due to the current flowing through the first ring portion 81, and this magnetomotive force produces magnetic fluxes through the magnetic member 9 as well as the associated end of the rotor core 6. This magnetic fluxes are taken as a leakage reactance of the first ring portion 81 in design sence and produce leakage magnetic fluxes traversing the first ring portion 81 when flowing through the magnetic member 9. Since the leakage magnetic fluxes traverse the electrical conductive ring portion 81, an effect equivalent to an increase in the resistance of the first ring portion 81 is obtained due to the action of an eddy current produced by the leakage magnetic fluxes. This effect is known as the deep-slot effect and becomes more remarkable as the frequency of the current becomes higher. The frequency (secondary frequency) of the current flowing through the end ring 8 is equal to the power supply frequency and hence high at starting of the motor, while during operation of the motor, it is proportional to the slip of the motor and hence very low. Therefore, the first ring portion 8 in each end ring 8 shows a remarkable increase in resistance at the starting stage. It will be understood from the above explanation that the deep-slot effect (or skin effect) in the first ring portion 81 due to the magnetic member 9 interposed between the first and second ring portions is effectively obtained at starting of the motor, but does not appear during operation of the motor.

An explanation wil be made of the operation of an induction motor employing the rotor according to the embodiment of the invention. At starting, the frequency of the secondary current is equal to that of a power supply and hence the frequency of the current flowing through the end ring 8 is the same as the power supply frequency. Therefore, the impedance of the first ring portion 81 becomes high so that the current flows through the second ring portion 82 which has the smaller reactance and the larger resistance. Thus, an effect can be attained as if the secondary resistance was increased, when viewed from the primary side, i.e. the power supply terminals of the motor. The starting torque of the induction motor is proportional to the secondary resistance. Therefore, the starting torque can be increased, and at the same time the starting current can be suppressed, and thus a desirable starting characteristic can be realized.

During the steady operation of the induction motor, due to the low secondary current frequency, the aforementioned action of the eddy current as well as the skin effect also disappear. Thus, during the steady operation, the current flowing through the end rings 8 is divided in substantially inversely proportional relation to the resistances $r_{21}$ and $r_{22}$, so that the secondary resistance can be decreased to prevent the undesirable lowering of the operating efficiency.

Figure 4:
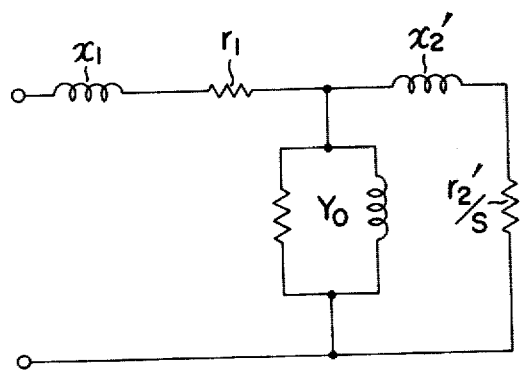
FIG. 4 shows an equivalent circuit of an induction motor employing the squirrel-cage rotor structure shown in FIGS. 2A and 2B.
Figure 5:
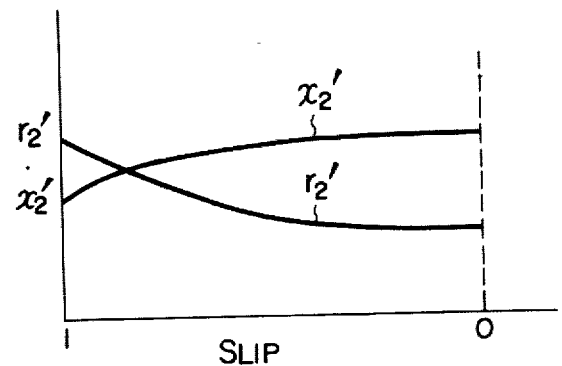
FIG. 5 is a graph showing variations in the secondary resistance and secondary reactance in the equivalent circuit shown in FIG. 4, relative to the slip in the induction motor.

FIG. 4 shows an equivalent circuit of the induction motor employing the squirrel-cage rotor structure according to the first embodiment of the present invention. In FIG. 4, the symbols $r_1$ and $x_1$ represent the primary resistance and primary reactance respectively, the symbols $r_2'$ and $x_2'$ represent the secondary resistance and secondary reactance in terms of the primary side respectively, and the symbol $Y_o$ represents the exciting admittance. The secondary resistance $r_2'$ and the secondary reactance $x_2'$ vary in a manner as shown in FIG. 5 relative to the motor speed, hence, the slip S. It will be seen in FIG. 5 that the secondary resistance $r_2'$ decreases and the secondary reactance $x_2'$ increases with the decrease in the slip S, in comparison with those in the starting stage. This characteristic is analogous to that of a deep-slot squirrel-cage induction motor. Therefore, the speed-torque characteristic of the induction motor employing the squirrel-cage rotor embodying the present invention is analogous to that of the deep-slot squirrel-cage induction motor as shown by the curve A in FIG. 6. The curve B in FIG. 6 represents the speed-torque characteristic of a squirrel-cage induction motor of conventional type.

Figure 6:
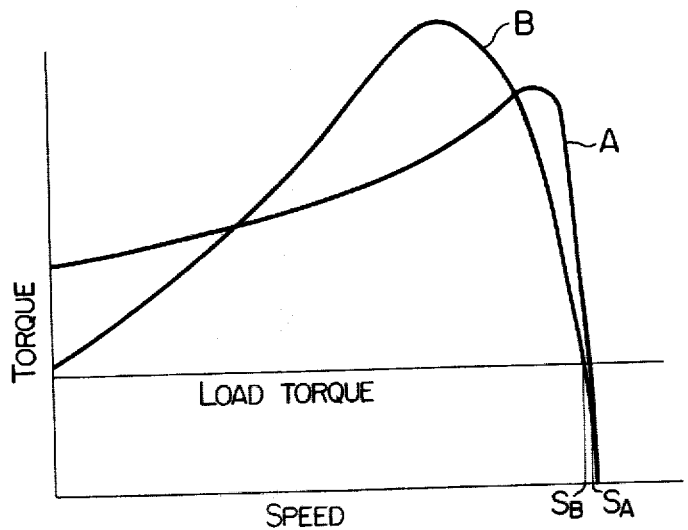
FIG. 6 is a graph showing the speed-torque characteristic of the induction motor employing the squirrel-cage rotor structure shown in FIGS. 2A and 2B.

It will be seen from the curve A shown in FIG. 6 that the starting torque of the induction motor employing the squirrel-cage rotor embodying the present invention can be greatly improved over that of the conventional squirrel-cage induction motor. Although FIG. 6 shows that the maximum torque of the induction motor employing the squirrel-cage rotor embodying the present invention is slightly lower than that of the conventional squirrel-cage induction motor, the operating efficiency is not degraded in any way because the slip relative to the maximum torque is also reduced. The maximum torque of the induction motor employing the squirrel-cage rotor embodying the present invention is smaller than that of the conventional squirrel-cage induction motor because the provision of the magnetic member 9 in each end ring 8 to form a leakage flux circuit increases the secondary reactance. Also, the slip relative to the maximum torque is reduced due to the increase in the secondary reactance. In other words, since the maximum torque appears when the slip is equal to the ratio of the secondary resistance to the secondary reactance, the slip relative to the maximum torque is reduced when the value of the secondary resistance is considered to be constant and the value of the secondary reactance relative to such a value of the secondary resistance increases. In FIG. 6, the symbols $S_A$ and $S_B$ designate the speeds of the respective induction motors under their practically loaded conditions.

As will be understood from the foregoing description, according to the embodiment of the invention, a desirable starting characteristic of an induction motor can be obtained without increasing the diameter of the rotor and increasing the size of the motor.

Figure 7A:
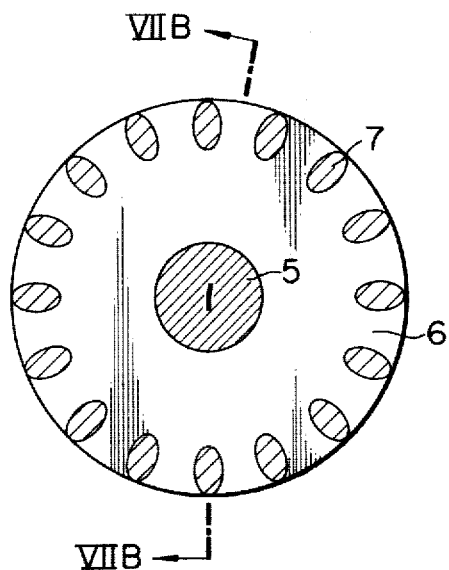
FIGS. 7A and 7B are schematic sectional views of another embodiment of the squirrel-cage rotor according to the present invention.
Figure 7B:
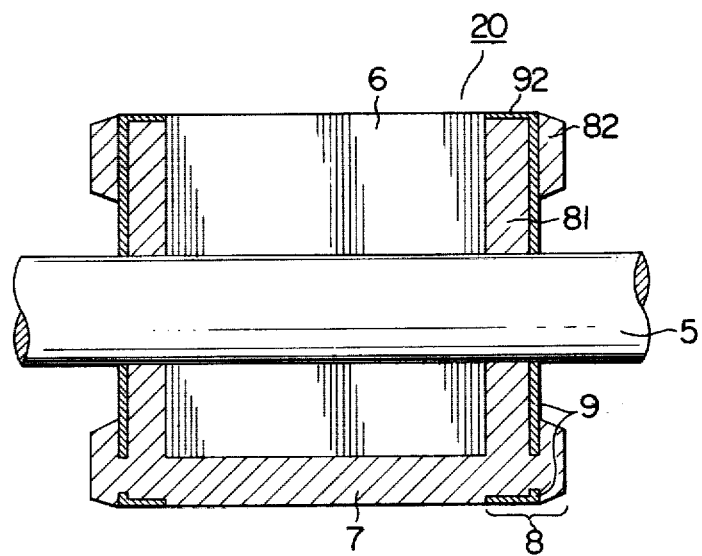

FIGS. 7A and 7B show another embodiment of the present invention. FIG. 7A is a schematic sectional view taken in a direction orthogonal with respect to the axial direction of the rotor, and FIG. 7B is a schematic axial sectional view taken along the line VIIB—VIIB in FIG. 7A. This embodiment is a partial modification of the first embodiment, and an additional member 92 which is annular in shape and is made of a magnetic material similar to that of the magnetic member 9 extends along the outer periphery of the first ring portion 81 in each end ring 8. The provision of such an additional magnetic member 92 in each end ring 8 can increase the reactance $x_{21}$ of the first ring portion 81 thereby further enhancing the effect described with reference to the first embodiment.

Figure 8:
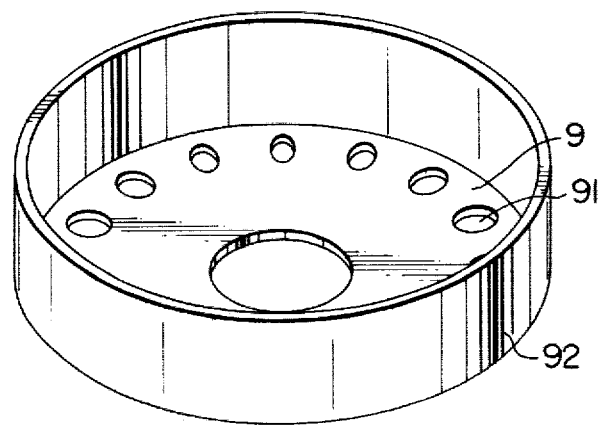
FIG. 8 is a schematic perspective view of the magnetic member incorporated in the embodiment shown in FIGS. 7A and 7B.

This additional magnetic member 92 may be separately provided or may be formed in integral relation with the main magnetic member 9 as shown in FIG. 8.

Figure 9A:
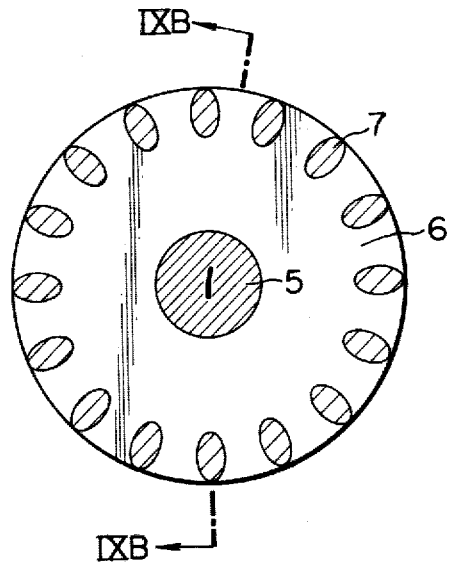
FIGS. 9A and 9B are schematic sectional views of still another embodiment of the squirrel-cage rotor according to the present invention.
Figure 9B:
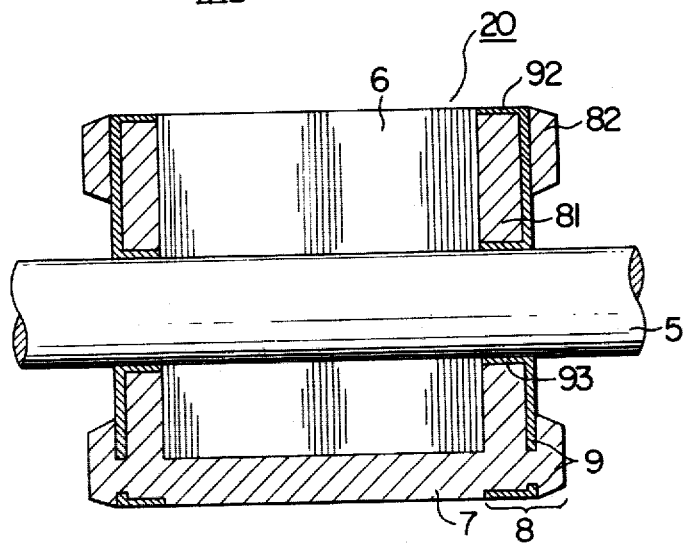

FIGS. 9A and 9B show still another embodiment of the present invention, in which FIG. 9A is a schematic sectional view taken in a direction orthogonal with respect to the axial direction of the rotor, and FIG. 9B is a schematic axial sectional view taken along the line IXB—IXB in FIG. 9A.

Figure 10:
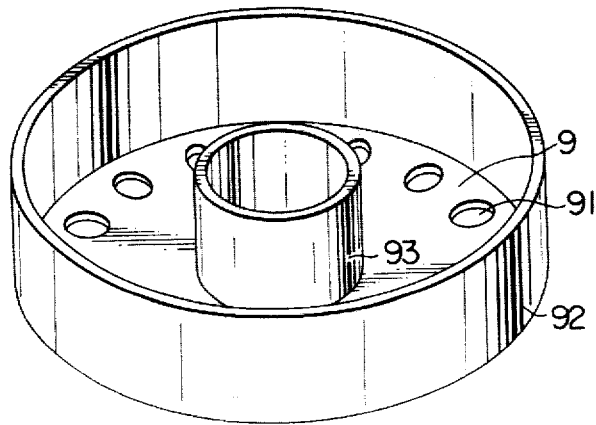
FIG. 10 is a schematic perspective view of the magnetic member incorporated in the embodiment shown in FIGS. 9A and 9B.

This embodiment is a modification of the embodiment shown in FIGS. 7A and 7B, and another additional magnetic member 93 which is also annular in shape is provided in each end ring 8 to extend along the inner periphery of the first ring portion 81. The provision of such an additional magnetic member 93 in each end ring 8 can further increase the reactance $x_{21}$ of the first ring portion 81 thereby further enhancing the aforementioned effect. This another additional magnetic member 93 may be separately provided or may be formed in integral relation with the main magnetic member 9 as shown in FIG. 10.

We claim:

1. A squirrel-cage rotor for an induction motor comprising a shaft to be disposed on the axis of the motor, a substantially cylindrical rotor core fixedly mounted on said shaft, a plurality of conductor bars received in respective slots formed along the outer peripheral surface of said rotor core and extending in substantially parallel relation with the axis of said motor, and a pair of end rings disposed adjacent to the opposite end faces of said rotor core and each acting as means for electrically connecting the associated ends of said conductor bars, each of said end rings comprising a first ring portion having one side surface disposed in contact with the associated end face of said rotor core and extending in a direction of a circumference around the axis of said shaft, said first ring portion being electrically connected to said conductor bars and having a relatively-large width in the radial direction, a plate member of a magnetic material contacting the other side surface of said first ring portion and being coaxial with the axis of said shaft, and a second ring portion disposed on said magnetic member and extending in a direction of a circumference around the axis of said shaft, said second ring portion being electrically connected to said first ring portion and to said conductor bars and having a relatively-small width in the radial direction and an axial sectional area which is smaller than the axial sectional area of said first ring portion, said first ring portions and said second ring portions of said pair of end rings being made of the same material as said conductor bars and being formed integrally with said conductor bars.

2. A squirrel-cage rotor as claimed in claim 1, wherein each of said end rings further comprises an outer member of a magnetic material extending from an outer peripheral edge of said magnetic plate member along the outer peripheral surface of said first ring portion.

3. A squirrel-cage rotor as claimed in claim 2, wherein said outer magnetic member is formed in integral relaton with said magnetic plate member.

4. A squirrel-cage rotor as claimed in claim 2, wherein each of said end rings further comprises an inner member of a magnetic material extending from an inner peripheral edge of said magnetic plate member along the inner peripheral surface of said first ring portion.

5. A squirrel-cage rotor as claimed in claim 4, wherein said outer magnetic member and said inner magnetic member are formed in integral relation with said magnetic plate member.

6. A squirrel-cage rotor as claimed in claim 1, 2, 3, 4 or 5, wherein said magnetic plate member is formed with a plurality of holes arranged in suitably circumferentially spaced relation on a circle around the axis of said motor.

* * * * *